(12) United States Patent
Tago et al.

(10) Patent No.: US 10,726,012 B2
(45) Date of Patent: Jul. 28, 2020

(54) METADATA REGISTRATION METHOD AND DEVICE

(71) Applicant: FUJITSU LIMITED, Kawasaki-shi, Kanagawa (JP)

(72) Inventors: Shinichiro Tago, Shinagawa (JP); Shuya Abe, Kawasaki (JP); Hiroaki Morikawa, Kawasaki (JP); Yutaka Mitsuishi, Kawasaki (JP); Nobuyuki Igata, Kawasaki (JP); Hodaka Yamamoto, Chiyoda (JP)

(73) Assignee: FUJITSU LIMITED, Kawasaki (JP)

( * ) Notice: Subject to any disclaimer, the term of this patent is extended or adjusted under 35 U.S.C. 154(b) by 172 days.

(21) Appl. No.: 15/490,612

(22) Filed: Apr. 18, 2017

(65) Prior Publication Data
US 2017/0337244 A1    Nov. 23, 2017

(30) Foreign Application Priority Data

May 17, 2016   (JP) .................................. 2016-098531

(51) Int. Cl.
*G06F 16/2453*    (2019.01)
*G06F 16/16*    (2019.01)
(Continued)

(52) U.S. Cl.
CPC ...... *G06F 16/24544* (2019.01); *G06F 16/164* (2019.01); *G06F 16/2282* (2019.01); *G06F 16/2455* (2019.01)

(58) Field of Classification Search
CPC ......... G06F 17/30466; G06F 17/30477; G06F 17/3012; G06F 17/30339; G06F 17/30333;
(Continued)

(56) References Cited

U.S. PATENT DOCUMENTS 8,495,211 B2 *   7/2013  Kuno ................... H04L 67/16
                                                           709/225
2007/0011192 A1 *  1/2007  Barton .............. G06F 17/30604
(Continued)

FOREIGN PATENT DOCUMENTS

| JP | 2008-090707 | 4/2008 |
|---|---|---|
| JP | 2009-134445 | 6/2009 |
| JP | 2014-092967 | 5/2014 |

*Primary Examiner* — Robert W Beausoliel, Jr.
*Assistant Examiner* — Mohammad Solaiman Bhuyan
(74) *Attorney, Agent, or Firm* — Fujitsu Patent Center

(57) ABSTRACT

A method includes acquiring one or a plurality of first tables including a first data group regarding a first item, acquiring a second table corresponding to a result of executing a program with the one or the plurality of first tables set as an input, the second table including a second item and a second data group, generating, when a first name of the first item and a second name of the second item have a relationship in which the first name partially matches the second name, first information indicating the relationship between the first name and the second name while defining parts that partially match, registering the first information in a memory as metadata for the program, the metadata indicating a relationship between the one or the plurality of first tables set as the input and the second table set as an output.

19 Claims, 24 Drawing Sheets

(51) Int. Cl.
*G06F 16/22* (2019.01)
*G06F 16/2455* (2019.01)

(58) Field of Classification Search
CPC ........... G06F 16/24544; G06F 16/2455; G06F 16/164; G06F 16/2282
See application file for complete search history.

(56) References Cited

U.S. PATENT DOCUMENTS

| | | | |
|---|---|---|---|
| 2008/0140696 A1* | 6/2008 | Mathuria | G06F 16/221 |
| 2009/0024997 A1* | 1/2009 | Kobayashi | G06F 9/4494 |
| | | | 718/101 |
| 2011/0173149 A1* | 7/2011 | Schon | G06F 16/24564 |
| | | | 706/48 |
| 2016/0140116 A1* | 5/2016 | Li | G06F 16/214 |
| | | | 707/609 |
| 2016/0357815 A1* | 12/2016 | Mielenhausen | G06F 16/284 |
| 2017/0091315 A1* | 3/2017 | Finlay | G06F 17/30315 |

* cited by examiner

FIG. 3

| INPUT-OUTPUT TYPE | MATCHING STATE | ITEM NAME EXAMPLE | REGISTRATION FORMAT | REGISTRATION EXAMPLE |
|---|---|---|---|---|
| INPUT TO INPUT | EXACT MATCH | abc AND abc | INPUT: X, INPUT: X | INPUT: X, INPUT: X |
| INPUT TO INPUT | PARTIAL MATCH | abcde AND bcd | INPUT: X, INPUT: A+X+B | INPUT: X, INPUT: a+X+d |
| INPUT TO OUTPUT | MATCH OF INPUT WITH OUTPUT BY RIGHT TRUNCATION | INPUT: abc, OUTPUT: abcde | INPUT: X, OUTPUT: X + A | INPUT: X, OUTPUT: X + de |

FIG. 4

| INPUT-OUTPUT TYPE | MATCHING STATE | DATA EXAMPLE | THRESHOLD CONDITION | REGISTRATION FORMAT | REGISTRATION EXAMPLE |
|---|---|---|---|---|---|
| INPUT TO INPUT | EXACT MATCH | abc AND abc | 80% OR HIGHER | INPUT: C, INPUT: D | INPUT: DAY, INPUT: DATE |
| INPUT TO INPUT | PARTIAL MATCH | abcde AND bcd | 50% OR HIGHER | INPUT: C, INPUT: D | INPUT: SALES, INPUT: SALES |
| INPUT TO OUTPUT | EXACT MATCH | abc AND abc | 95% OR HIGHER | INPUT: C, OUTPUT: E | INPUT: DAY, OUTPUT: DAY |
| INPUT TO OUTPUT | MATCH OF OUTPUT WITH INPUT BY RIGHT TRUNCATION | INPUT: abcde, OUTPUT: abc | 90% OR HIGHER | INPUT: C, OUTPUT: E | INPUT:BRANCH NAME, OUTPUT:SIMPLE BRANCH |

FIG. 8

| PROGRAM | META DATA |
|---|---|
| sum_month | INPUT: X,<br>OUTPUT: X + TOTAL FOR MONTH |

FIG. 11

| PROGRAM | META DATA |
|---|---|
| sum_month | INPUT: X, OUTPUT: X + TOTAL FOR MONTH<br>INPUT: DAY, OUTPUT: MONTH |

FIG. 16A

| SALES |
|---|
| 8293 |
| 9228 |
| 9482 |
| ⋮ |

VS

| SHOP NAME |
|---|
| BRANCH A |
| BRANCH B |
| BRANCH C |
| ⋮ |

⟹ UNSATISFIED

FIG. 16B

| SALES |
|---|
| 8293 |
| 9228 |
| 9482 |
| ⋮ |

VS

| TELEPHONE NUMBER |
|---|
| 03-1111-xxxx |
| 03-2222-xxxx |
| 03-3333-xxxx |
| ⋮ |

⟹ UNSATISFIED

FIG. 17

| PROGRAM | META DATA |
|---|---|
| sum_month | INPUT: X, OUTPUT: X + TOTAL FOR MONTH<br>INPUT: DAY, OUTPUT: MONTH |
| join_branch | INPUT: BRANCH NAME, INPUT: SHOP NAME |

*OTHER COMBINATIONS DO NOT SATISFY
REGISTRATION CONDITION EITHER

*CHECK WHETHER OTHER COMBINATIONS
SIMILARLY SATISFY REGISTRATION CONDITION

FIG. 20

| PROGRAM | META DATA |
|---|---|
| sum_month | INPUT: X, OUTPUT: X + TOTAL FOR MONTH<br>INPUT: DAY, OUTPUT: MONTH |
| join_branch | INPUT: BRANCH NAME, INPUT: SHOP NAME<br>INPUT: BRANCH NAME, OUTPUT: BRANCH NAME<br>INPUT: TELEPHONE NUMBER, OUTPUT: TELEPHONE NUMBER<br>INPUT: SALES, OUTPUT: SALES<br>INPUT: DAY, OUTPUT: DAY |

FIG. 21

| DAY | BRANCH NAME | LOCATION (PREFECTURE) | SALES |
|---|---|---|---|

FIG. 22A

| TABLE | ITEM NAME |
|---|---|
| WAREHOUSE LOCATION | WAREHOUSE NAME (LOCATION (PREFECTURE)) |
| SHOP LOCATION | SHOP NAME (LOCATION (PREFECTURE)) |
| SALES | (DAY) (BRANCH NAME) (SALES) |

FIG. 22B

| PROGRAM | META DATA |
|---|---|
| trans_siten | INPUT : BRANCH NAME, (OUTPUT : BRANCH NAME) |
| sum_month | (INPUT : DAY) OUTPUT : MONTH<br>INPUT: X & OUTPUT X+TOTAL FOR MONTH |
| join_branch | (INPUT : BRANCH NAME), (INPUT : SHOP NAME) |

FIG. 23A

| WAREHOUSE NAME | LOCATION (PREFECTURE) |
|---|---|
| X | TOKYO |
| Y | TOKYO |
| Z | SAITAMA |
| ⋮ | ⋮ |

FIG. 23B

| SHOP NAME | LOCATION (PREFECTURE) |
|---|---|
| BRANCH A | TOKYO |
| BRANCH B | TOKYO |
| BRANCH C | SAITAMA |
| ⋮ | ⋮ |

FIG. 23C

| DAY | BRANCH NAME | SALES |
|---|---|---|
| 2015.1.1 | BRANCH A | 8293 |
| 2015.1.1 | BRANCH B | 9228 |
| 2015.1.1 | BRANCH C | 9482 |
| ⋮ | ⋮ | ⋮ |

METADATA REGISTRATION METHOD AND DEVICE

CROSS-REFERENCE TO RELATED APPLICATION

This application is based upon and claims the benefit of priority of the prior Japanese Patent Application No. 2016-098531, filed on May 17, 2016, the entire contents of which are incorporated herein by reference.

FIELD

The embodiment discussed herein is related to a technology for registering metadata.

BACKGROUND

When metadata of a program is created, maintenance of the program, use of the program for other purposes, or the like may be achieved by using the metadata. However, it takes a great deal of time and effort to manually create and register metadata.

Regarding generation of metadata, some documents disclose a technology for generating metadata of a program by analyzing the program itself (for example, Japanese Laid-open Patent Publication No. 2009-134445, Japanese Laid-open Patent Publication No. 2008-090707, and Japanese Laid-open Patent Publication No. 2014-092967).

SUMMARY

According to an aspect of the invention, a method includes acquiring one or a plurality of first tables including a first data group regarding a first item, acquiring a second table corresponding to a result of executing a program with the one or the plurality of first tables set as an input, the second table including a second item and a second data group, generating, when a first name of the first item and a second name of the second item have a relationship in which the first name partially matches the second name, first information indicating the relationship between the first name and the second name while defining parts that partially match, registering the first information in a memory as metadata for the program, the metadata indicating a relationship between the one or the plurality of first tables set as the input for the program and the second table set as an output for the input, and outputting, when an instruction to output the metadata of the program is received, the metadata including the first information that is acquired from the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of registration conditions regarding item names;

FIG. 4 is a diagram illustrating an example of registration conditions regarding data;

FIG. 8 is a diagram for describing the operation to be performed when metadata is registered for the program "sum_month";

FIG. 11 is a diagram for describing the operation to be performed when metadata is registered for the program "sum_month";

FIGS. 16A and 16B are diagrams for describing the operation to be performed when metadata is registered for the program "join_branch";

FIG. 17 is a diagram for describing the operation to be performed when metadata is registered for the program "join_branch";

FIG. 20 is a diagram for describing the operation to be performed when metadata is registered for the program "join_branch";

FIG. 21 is a diagram for describing an example of use of metadata in detail;

FIGS. 22A and 22B are diagrams for describing the example of the use of metadata in detail;

FIGS. 23A, 23B, and 23C are diagrams for describing the example of the use of metadata in detail.

DESCRIPTION OF EMBODIMENT

In the related art, generation of appropriate metadata may result in failure even when a program itself is analyzed. Therefore, in one aspect, an object of the embodiment discussed herein is to provide a technology for automatically registering metadata of a program.

Figure 1:
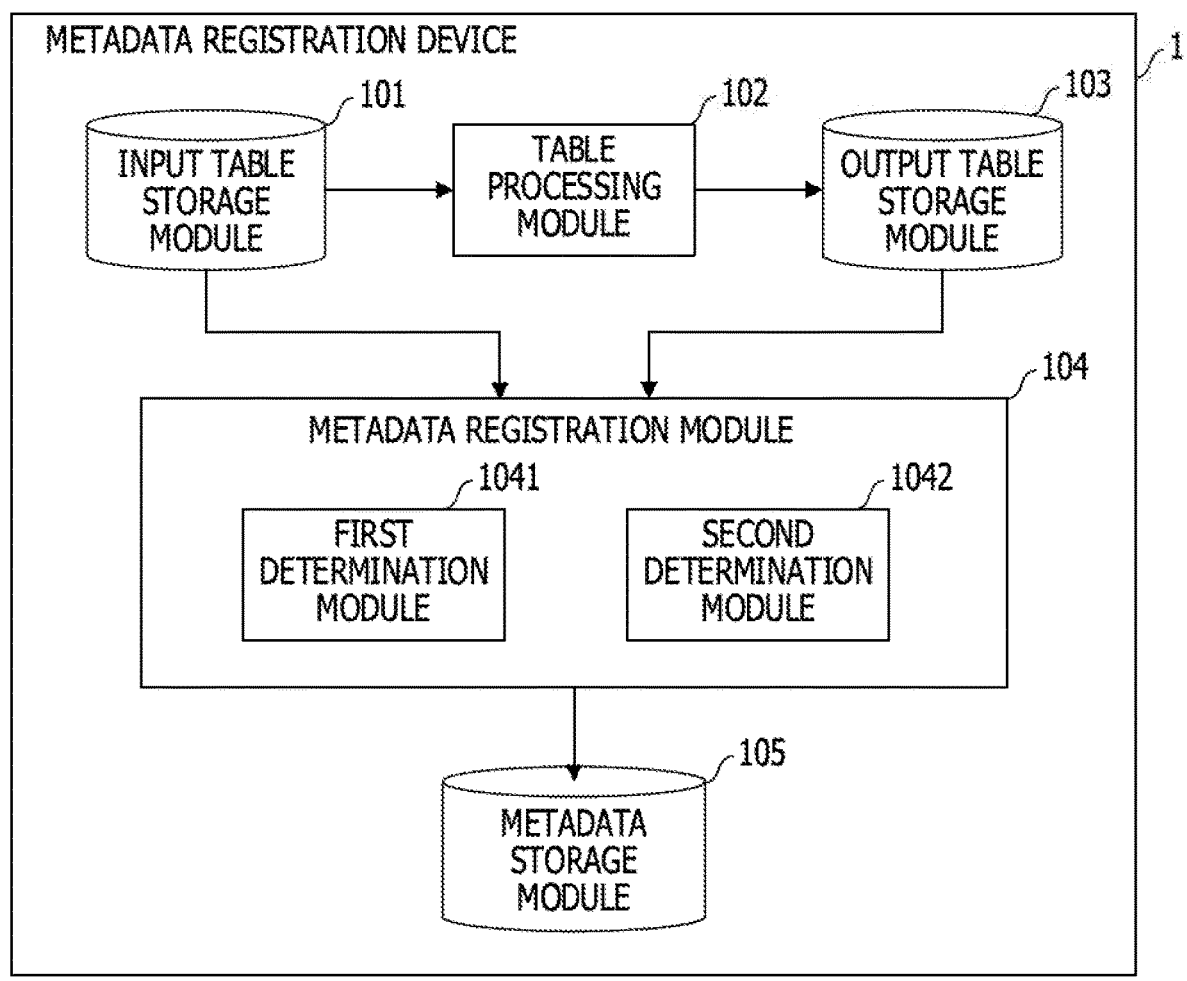
FIG. 1 is a functional block diagram of a metadata registration device.

FIG. 1 is a functional block diagram of a metadata registration device 1 according to this embodiment. The metadata registration device 1 includes an input table storage module 101, a table processing module 102, an output table storage module 103, a metadata registration module 104, and a metadata storage module 105. The metadata registration module 104 includes a first determination module 1041 and a second determination module 1042.

The table processing module 102 generates an output table from one or a plurality of input tables stored in the input table storage module 101, and stores the output table in the output table storage module 103. The table processing module 102 is implemented through execution of a program by a central processing unit (CPU). In this embodiment, metadata is registered for this program.

The first determination module 1041 and the second determination module 1042 of the metadata registration module 104 generate metadata from the input table stored in the input table storage module 101 and the output table stored in the output table storage module 103. Then, the metadata registration module 104 stores the generated metadata in the metadata storage module 105.

Next, an operation of the metadata registration device 1 is described with reference to FIG. 2 to FIG. 20. It is assumed that an output table has already been stored in the output table storage module 103 by the processing performed by the table processing module 102.

Figure 2:
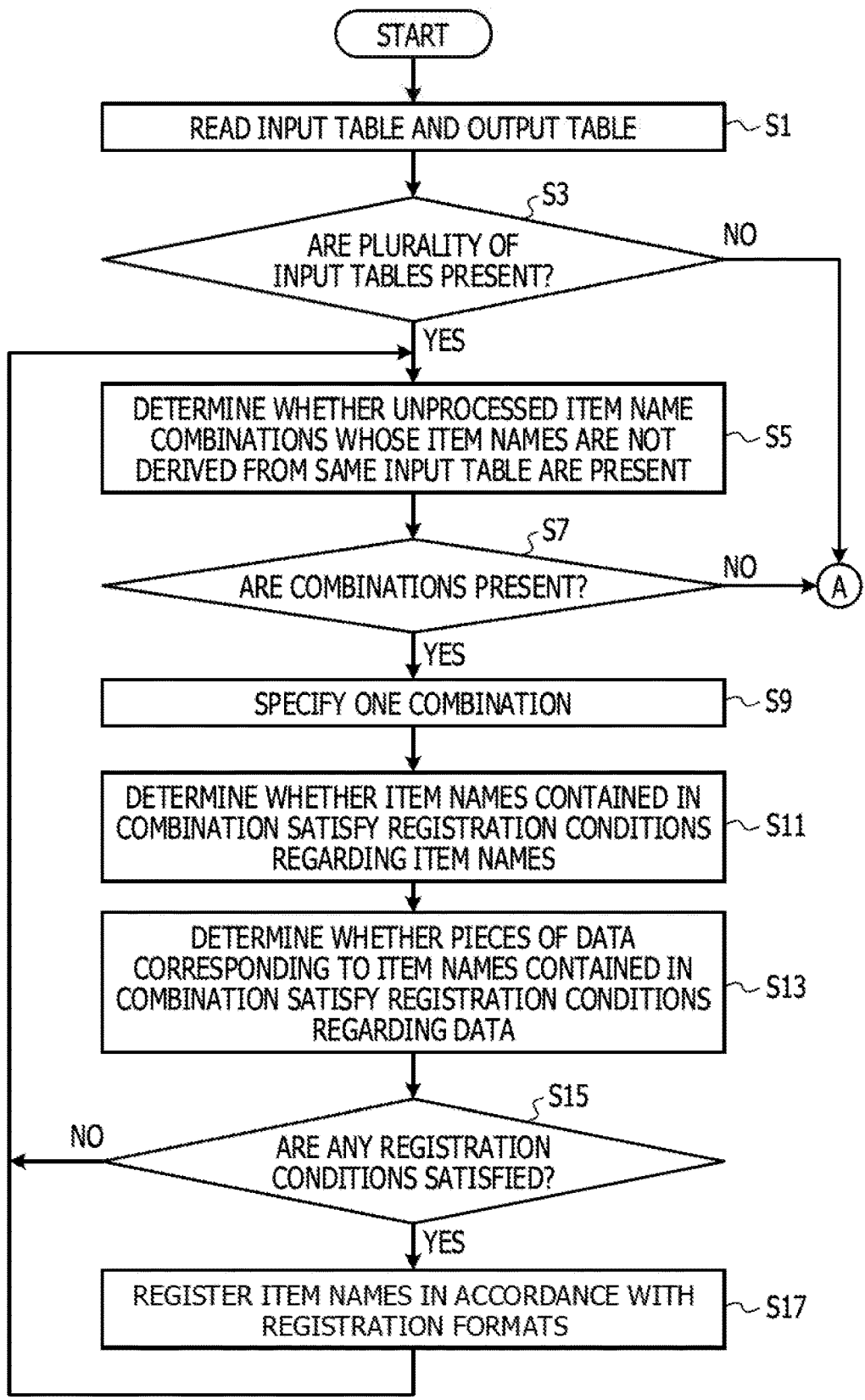
FIG. 2 is a diagram illustrating a main processing flow.

First, the metadata registration module 104 reads the input table stored in the input table storage module 101 and the output table stored in the output table storage module 103 (FIG. 2: Step S1).

Then, the first determination module 1041 of the metadata registration module 104 determines whether a plurality of input tables have been read in Step S1 (Step S3). When a plurality of input tables have not been read (Step S3: No), the processing proceeds to Step S19 of FIG. 5 via Connector A.

When a plurality of input tables have been read in Step S1 (Step S3: Yes), the first determination module 1041 executes the following processing. Specifically, the first determination module 1041 determines whether combinations of item names included in the plurality of input tables (combinations of two item names are assumed in this embodiment) include unprocessed combinations whose item names are not derived from the same input table (Step S5).

For example, it is assumed that "day", "branch name", and "sales" are included in a certain input table as item names and "shop name" and "telephone number" are included in another input table as item names. In this case, it is determined whether six combinations of (day, shop name), (day, telephone number), (branch name, shop name), (branch name, telephone number), (sales, shop name), and (sales, telephone number) include unprocessed combinations.

When unprocessed combinations whose item names are not derived from the same input table are not present (Step S7: No), the processing proceeds to Step S19 of FIG. 5 via Connector A. When unprocessed combinations whose item names are not derived from the same input table are present (Step S7: Yes), the first determination module 1041 specifies one unprocessed combination whose item names are not derived from the same input table (Step S9).

The first determination module 1041 determines whether the item names included in the combination specified in Step S9 satisfy registration conditions regarding item names (Step S11).

FIG. 3 illustrates an example of the registration conditions regarding item names. In the example of FIG. 3, an input-output type, a matching state, an item name example, a registration format, and a registration example are illustrated for each registration condition regarding item names. In FIG. 3, "A" and "B" represent a part of an item name and "X" represents a variable part. In Step S11, determination is made for registration conditions in the first row and the second row whose input-output types are "input to input". "Partial match" means that an item name is included in another item name. And "match of input with output by right truncation" is one of "partial match".

The first determination module 1041 determines whether pieces of data corresponding to the item names included in the combination specified in Step S9 (that is, pieces of data in the same columns as those of the item names, which are also referred to as item values) satisfy registration conditions regarding data (Step S13).

FIG. 4 illustrates an example of the registration conditions regarding data. In the example of FIG. 4, an input-output type, a matching state, a data example, a threshold condition, a registration format, and a registration example are illustrated for each registration condition regarding data. In FIG. 4, "C" and "D" each represent an item name of the input table and "E" represents an item name of the output table. In Step S13, determination is made for registration conditions in the first row and the second row whose input-output types are "input to input".

The first determination module 1041 determines whether it has been determined that the registration conditions regarding item names have been satisfied in the processing of Step S11 or the registration conditions regarding data have been satisfied in the processing of Step S13 (Step S15).

When neither of the registration conditions regarding item names nor the registration conditions regarding data has been satisfied (Step S15: No), the processing returns to the processing of Step S5 in order to process the next combination.

When it has been determined that at least one of the registration conditions regarding item names and the registration conditions regarding data has been satisfied (Step S15: Yes), the first determination module 1041 executes the following processing. Specifically, the first determination module 1041 registers metadata regarding the item names included in the combination specified in Step S9 in the metadata storage module 105 in accordance with the registration formats illustrated in FIG. 3 and FIG. 4 (Step S17). Then, the processing returns to the processing of Step S5 in order to process the next combination.

Figure 5:
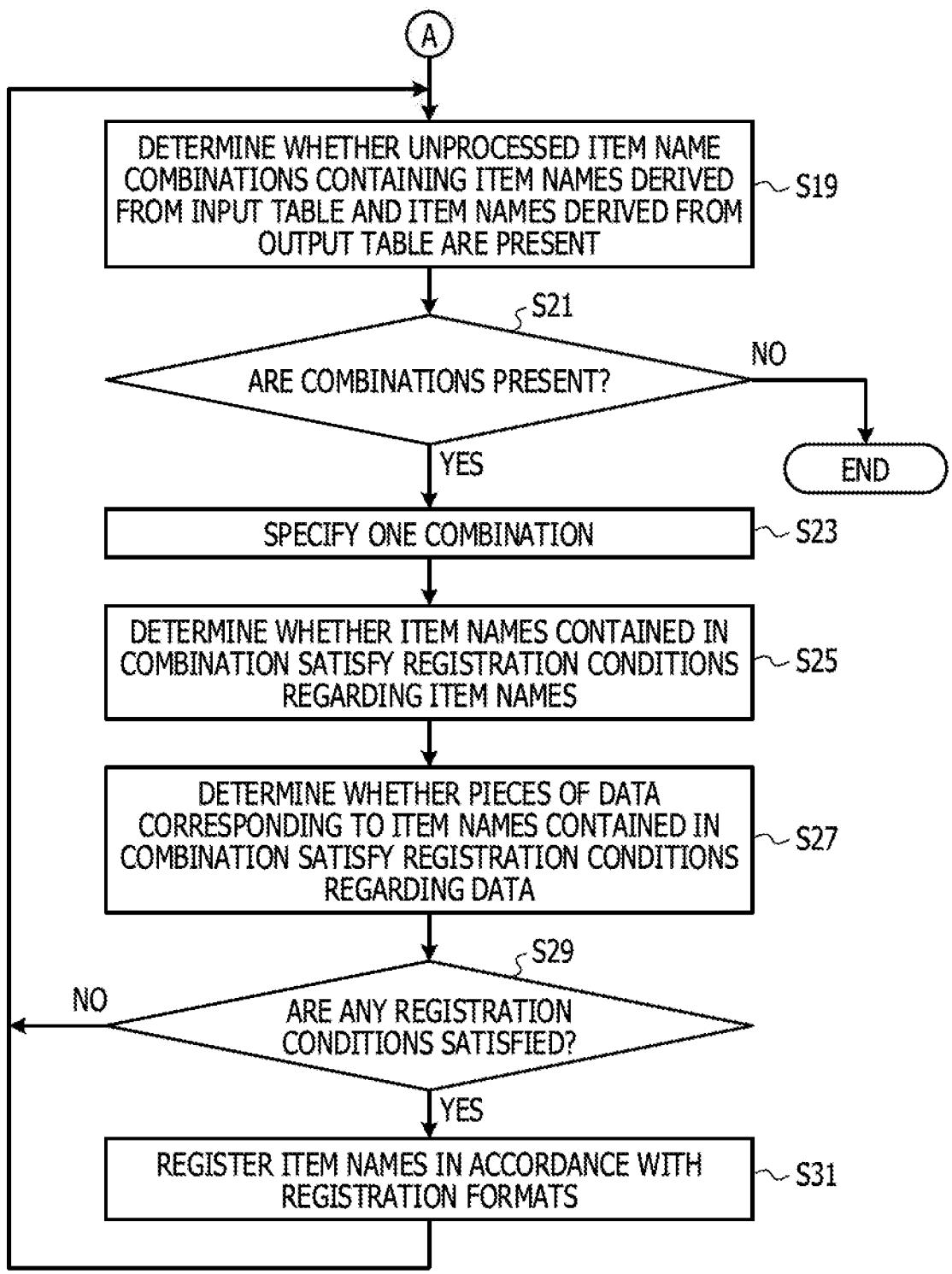
FIG. 5 is a diagram illustrating the main processing flow.

Processing subsequent to Connector A is described with reference to FIG. 5. First, the second determination module 1042 determines whether combinations of item names included in a certain input table and item names included in a certain output table (combinations of two item names are assumed in this embodiment) include unprocessed combinations (Step S19).

For example, it is assumed that "day" and "sales" are included in a certain input table as item names and "month" and "sales total for month" are included in a certain output table as item names. In this case, it is determined whether four combinations of (day, month), (day, sales total for month), (sales, month), and (sales, sales total for month) include unprocessed combinations.

When unprocessed combinations are not present (Step S21: No), the processing is terminated. When unprocessed combinations are present (Step S21: Yes), the second determination module 1042 specifies one unprocessed combination (Step S23).

The second determination module 1042 determines whether the item names included in the combination specified in Step S23 satisfy registration conditions regarding item names (Step S25). When the registration conditions regarding item names are, for example, the registration conditions illustrated in FIG. 3, determination in Step S25 is made for a registration condition in the third row whose input-output type is "input to output".

The second determination module 1042 determines whether pieces of data corresponding to the item names included in the combination specified in Step S23 (that is, pieces of data in the same columns as those of the item names, which are also referred to as item values) satisfy registration conditions regarding data (Step S27). When the registration conditions regarding data are, for example, the registration conditions illustrated in FIG. 4, determination in Step S27 is made for registration conditions in the third row and the fourth row whose input-output types are "input to output".

The second determination module 1042 determines whether it has been determined that the registration condition regarding item names has been satisfied in the processing of Step S25 or the registration conditions regarding data have been satisfied in the processing of Step S27 (Step S29).

When neither of the registration condition regarding item names nor the registration conditions regarding data has been satisfied (Step S29: No), the processing returns to the processing of Step S19 in order to process the next combination.

When it has been determined that at least one of the registration condition regarding item names and the registration conditions regarding data has been satisfied (Step S29: Yes), the second determination module 1042 executes the following processing. Specifically, the second determination module 1042 registers metadata regarding the item names included in the combination specified in Step S23 in the metadata storage module 105 in accordance with the registration formats illustrated in FIG. 3 and FIG. 4 (Step S31). Then, the processing returns to the processing of Step S19 in order to process the next combination.

By executing the processing described above, relationships are found between the input table and the output table. Thus, the metadata of the program may automatically be registered without manual operation.

Next, the operation of the metadata registration device 1 is described in more detail with reference to FIG. 6 to FIG. 20. It is assumed that the registration conditions regarding item names are the registration conditions illustrated in FIG. 3 and that the registration conditions regarding data are the registration conditions illustrated in FIG. 4.

Figure 6:
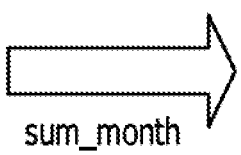
FIG. 6 is a diagram for describing an operation to be performed when metadata is registered for a program "sum_month"

For example, as illustrated in FIG. 6, it is assumed that an output table 62 is generated from an input table 61 by the table processing module 102 associated with a program "sum_month". The input table 61 includes "day" and "sales" as item names and the output table 62 includes "month" and "sales total for month" as item names.

Figure 7:
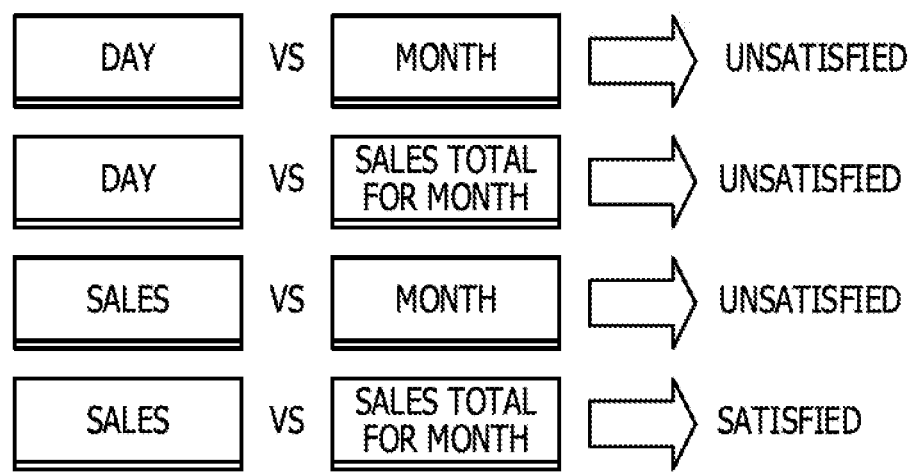
FIG. 7 is a diagram for describing the operation to be performed when metadata is registered for the program "sum_month"

In this case, as illustrated in FIG. 7, a combination of "sales" and "sales total for month" of the combinations of the item names satisfies a registration condition that the item name of the input table 61 matches the item name of the output table 62 by right truncation.

Thus, as illustrated in FIG. 8, metadata indicating a relationship between the item name "sales" of the input table 61 and the item name "sales total for month" of the output table 62 is registered in the metadata storage module 105 in association with identification information of the program.

Figure 9A:
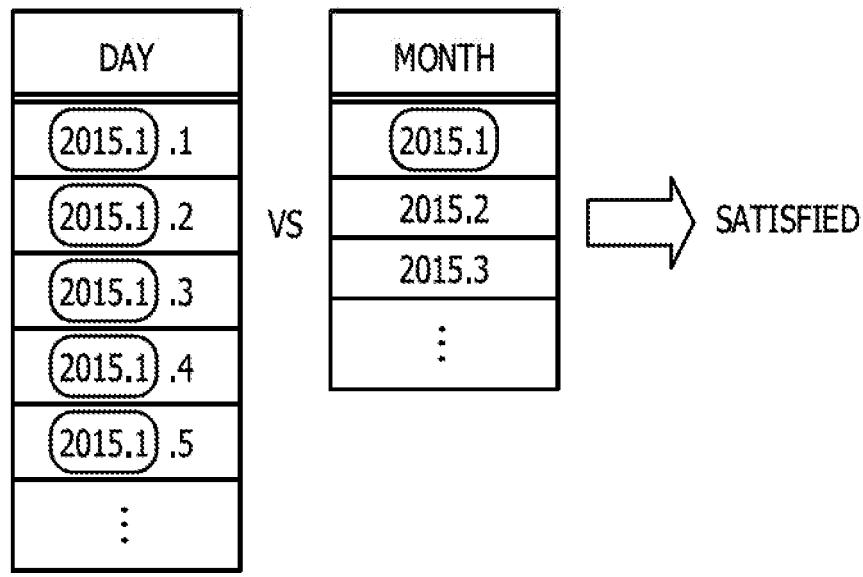
FIGS. 9A and 9B are diagrams for describing the operation to be performed when metadata is registered for the program "sum_month"

As illustrated in FIG. 9A, the data corresponding to the item name "month" of the output table 62 matches the data corresponding to the item name "day" of the input table 61 by right truncation at 90% or higher. Thus, this combination satisfies the registration condition regarding data.

Figure 9B:
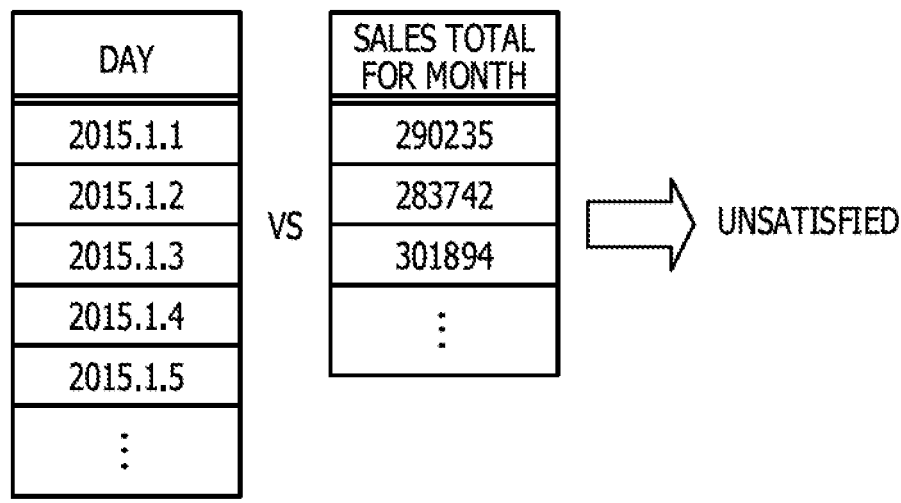

As illustrated in FIG. 9B, a combination of the data corresponding to the item name "sales total for month" of the output table 62 and the data corresponding to the item name "day" of the input table 61 does not satisfy the registration conditions regarding data.

Figure 10A:
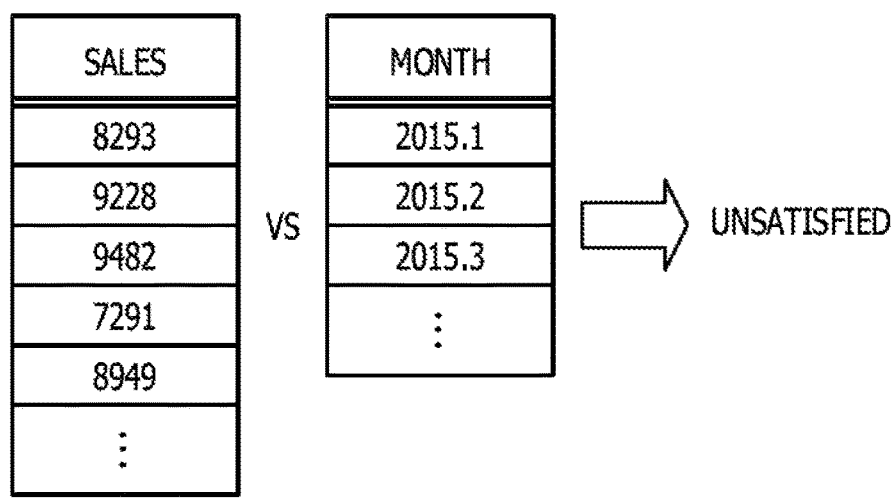
FIGS. 10A and 10B are diagrams for describing the operation to be performed when metadata is registered for the program "sum_month"

As illustrated in FIG. 10A, a combination of the data corresponding to the item name "month" of the output table 62 and the data corresponding to the item name "sales" of the input table 61 does not satisfy the registration conditions regarding data.

Figure 10B:
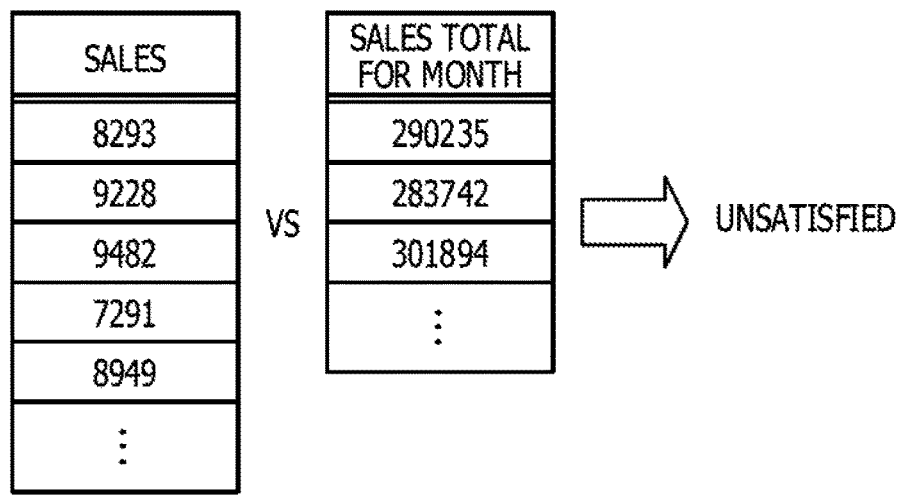

As illustrated in FIG. 10B, a combination of the data corresponding to the item name "sales total for month" of the output table 62 and the data corresponding to the item name "sales" of the input table 61 does not satisfy the registration conditions regarding data.

Thus, as illustrated in FIG. 11, metadata including the item name "day" of the input table 61 and the item name "month" of the output table 62 is registered in the metadata storage module 105 in association with the identification information of the program.

Figure 12:
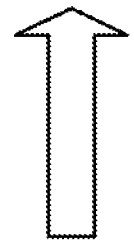
FIG. 12 is a diagram for describing an operation to be performed when metadata is registered for a program "join_branch"

For example, as illustrated in FIG. 12, it is assumed that an output table 123 is generated from an input table 121 and an input table 122 by the table processing module 102 associated with a program "join_branch". The input table 121 includes "day", "branch name", and "sales" as item names, the input table 122 includes "shop name" and "telephone number" as item names, and the output table 123 includes "day", "branch name", "telephone number", and "sales" as item names.

Figure 13:
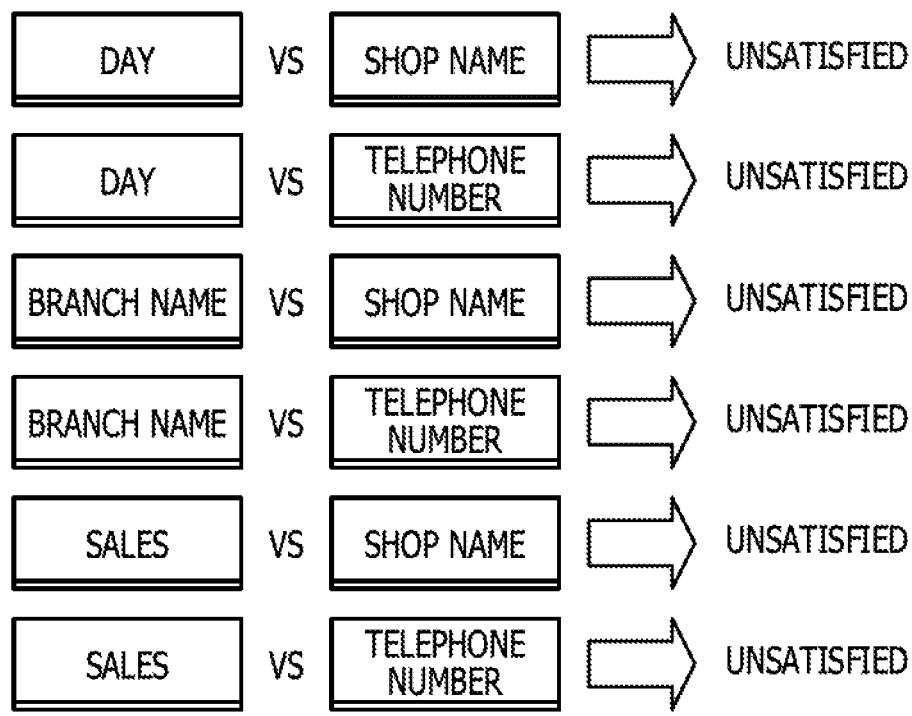
FIG. 13 is a diagram for describing the operation to be performed when metadata is registered for the program "join_branch"

In this case, as illustrated in FIG. 13, there is no combination that satisfies the registration conditions regarding item names.

Figure 14A:
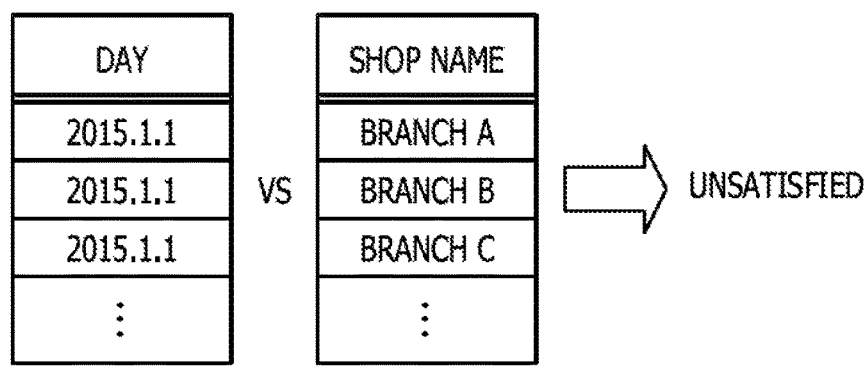
FIGS. 14A and 14B are diagrams for describing the operation to be performed when metadata is registered for the program "join_branch"

As illustrated in FIG. 14A, a combination of the data corresponding to the item name "day" of the input table 121 and the data corresponding to the item name "shop name" of the input table 122 does not satisfy the registration conditions regarding data.

Figure 14B:
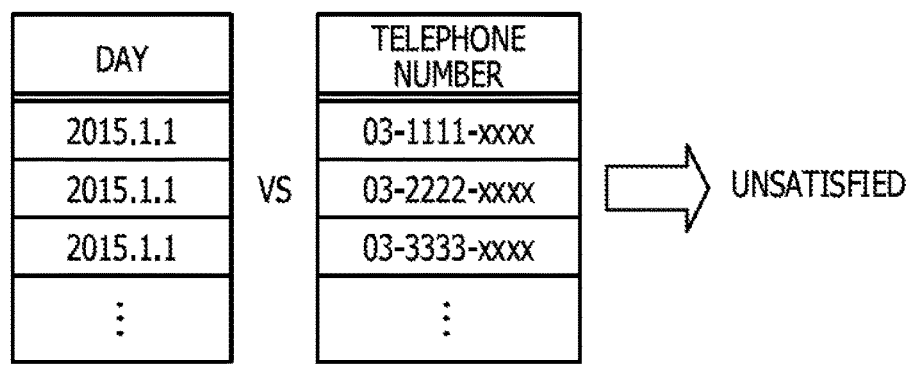

As illustrated in FIG. 14B, a combination of the data corresponding to the item name "day" of the input table 121 and the data corresponding to the item name "telephone number" of the input table 122 does not satisfy the registration conditions regarding data.

Figure 15A:
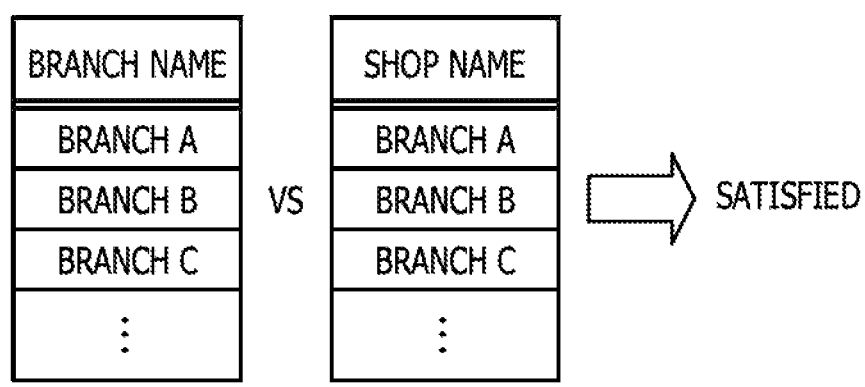
FIGS. 15A and 15B are diagrams for describing the operation to be performed when metadata is registered for the program "join_branch"

As illustrated in FIG. 15A, the data corresponding to the item name "branch name" of the input table 121 exactly matches the data corresponding to the item name "shop name" of the input table 122 at 80% or higher, and hence the registration condition regarding data is satisfied.

Figure 15B:
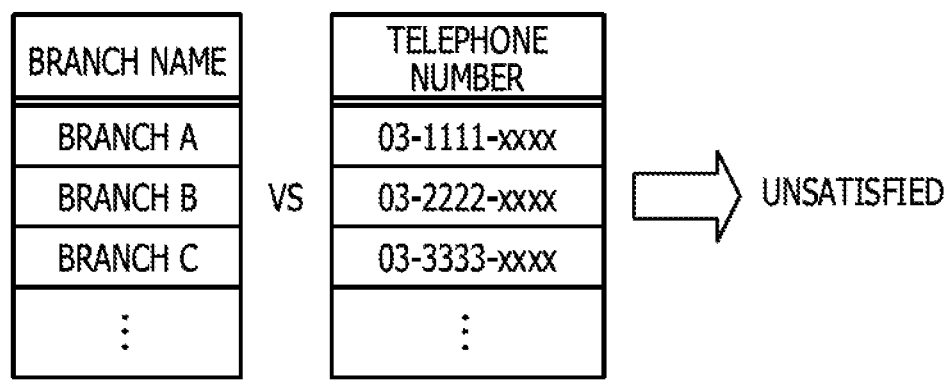

As illustrated in FIG. 15B, a combination of the data corresponding to the item name "branch name" of the input table 121 and the data corresponding to the item name "telephone number" of the input table 122 does not satisfy the registration conditions regarding data.

As illustrated in FIG. 16A, a combination of the data corresponding to the item name "sales" of the input table 121 and the data corresponding to the item name "shop name" of the input table 122 does not satisfy the registration conditions regarding data.

As illustrated in FIG. 16B, a combination of the data corresponding to the item name "sales" of the input table 121 and the data corresponding to the item name "telephone number" of the input table 122 does not satisfy the registration conditions regarding data.

Thus, as illustrated in FIG. 17, metadata including the item name "branch name" of the input table 121 and the item name "shop name" of the input table 122 is registered in the metadata storage module 105 in association with the identification information of the program.

Figure 18:
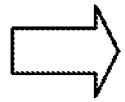
FIG. 18 is a diagram for describing the operation to be performed when metadata is registered for the program "join_branch"

As illustrated in FIG. 18, determination is made for a combination of the item name "day" of the input table 121 and the item name "day" of the output table 123 by a method similar to the method described with reference to FIG. 7. In this case, an exact match is established and hence the registration condition regarding item names is not satisfied. Further, other combinations regarding the input table 121 and the output table 123 and regarding the input table 122 and the output table 123 do not satisfy the registration condition regarding item names.

Figure 19:
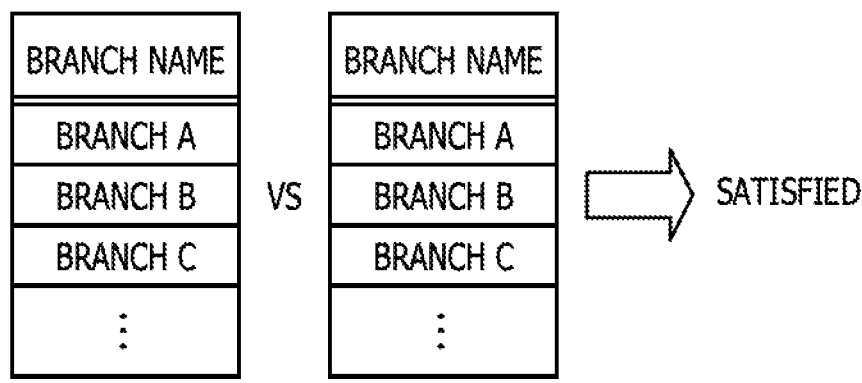
FIG. 19 is a diagram for describing the operation to be performed when metadata is registered for the program "join_branch"

As illustrated in FIG. 19, the data corresponding to the item name "branch name" of the input table 121 exactly matches the data corresponding to the item name "branch name" of the output table 123 at 95% or higher, and hence the registration condition regarding data is satisfied. Further, determination is made for other combinations regarding the input table 121 and the output table 123 and regarding the input table 122 and the output table 123 by a method similar to the method described with reference to FIGS. 9A, 9B, 10A, and 10B. When the registration condition is satisfied, metadata is registered in the metadata storage module 105.

As a result, metadata illustrated in FIG. 20 is registered in the metadata storage module 105. By using this metadata, maintenance of the program, use of the program for other purposes, or the like may be achieved.

One embodiment has been described above, but the embodiment discussed herein is not limited thereto. For example, the functional block configuration of the metadata registration device 1 described above may be different from an actual program module configuration.

The configuration of each table described above is an example and is not limited to the configuration described above. Further, in the processing flow, the order of the processing may be changed as long as the results of the processing are consistent. Still further, the processing may be executed in a parallel configuration.

The input table storage module 101, the output table storage module 103, and the metadata storage module 105 may be provided in an external storage device.

The processing of this embodiment may be executed by a plurality of computers.

APPENDIX

In the appendix, a method for using metadata is additionally described. Description is made of the use of metadata when a table including item names illustrated in FIG. 21 (hereinafter referred to as a target table) is generated.

First, tables including item names that match the item names included in the target table are specified based on metadata for tables illustrated in FIG. 22A. In FIG. 22A, item names enclosed by solid lines are the item names included in the target table. In this case, tables "warehouse location", "shop location", and "sales amount" illustrated in FIG. 22A are specified.

FIG. 23A is a diagram illustrating the table "warehouse location", FIG. 23B is a diagram illustrating the table "shop location", and FIG. 23C is a diagram illustrating the table "sales amount". The table "warehouse location" includes "warehouse name" and "location (prefecture)" as item names. The table "shop location" includes "shop name" and "location (prefecture)" as item names. The table "sales amount" includes "day", "branch name", and "sales" as item names.

Then, programs regarding item names that match the item names included in the target table are specified based on metadata for programs illustrated in FIG. 22B. In FIG. 22B, item names enclosed by solid lines are the item names included in the target table. In this case, programs "trans_siten", "sum_month", and "join_branch" illustrated in FIG. 22B are specified.

Then, in the order from a program including more matching item names, a specified program and a table including item names that match the item names included in the metadata of the program are output in association with each other. Specifically, the program "join_branch" and the tables "shop location" and "sales amount", the program "trans_siten" and the table "sales amount", and the program "sum_month" and the table "sales amount" are output in this order in association with each other.

The description of the appendix is now ended.

Figure 24:
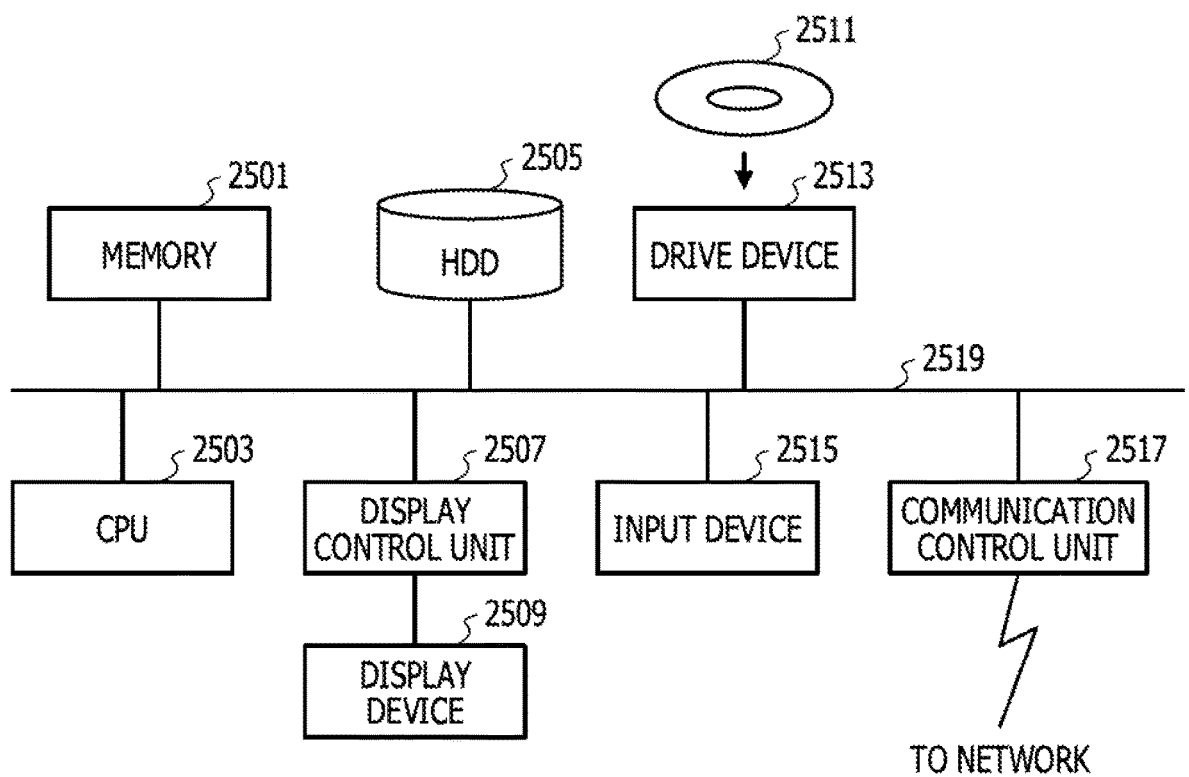
FIG. 24 is a functional block diagram of a computer.

The metadata registration device 1 described above is a computer device. As illustrated in FIG. 24, a memory 2501, a CPU 2503, a hard disk drive (HDD) 2505, a display control unit 2507 connected to a display device 2509, a drive device 2513 for a removable disk 2511, an input device 2515, and a communication control unit 2517 for connection to a network are connected to each other by a bus 2519. An operating system (OS) and application programs for executing the processing of this embodiment are stored in the HDD 2505 and are read from the HDD 2505 to the memory 2501 when executed by the CPU 2503. The CPU 2503 controls the display control unit 2507, the communication control unit 2517, and the drive device 2513 in accordance with details of the processing of the application programs to perform predetermined operations. Further, data which is being processed is mainly stored in the memory 2501 but may be stored in the HDD 2505. In the embodiment, the application programs for executing the processing described above are distributed while being stored in the computer-readable removable disk 2511 and are installed in the HDD 2505 from the drive device 2513. The application programs may be installed in the HDD 2505 via a network such as the Internet and the communication control unit 2517. This computer device implements various functions described above when hardware such as the CPU 2503 and the memory 2501 and programs such as the OS and the application programs described above organically cooperate with each other.

The embodiment described above is summarized as follows.

A metadata registration method according to this embodiment includes processing of (A) determining whether a relationship between a first item name included in a first table (for example, the input table according to the embodiment) and a second item name included in a second table (for example, the output table according to the embodiment) generated from the first table by executing a program satisfies a first condition including a condition of a match by right truncation, and (B) storing, when the relationship between the first item name and the second item name satisfies the first condition, metadata indicating the relationship between the first item name and the second item name in a data storage module in association with identification information of the program.

By executing the processing described above, metadata of the program for processing tables may automatically be registered without manual operation.

The metadata registration method may further include processing of (C) determining whether a relationship between data corresponding to the first item name and data corresponding to the second item name satisfies a second condition including a condition of a match by right truncation or an exact match, and (D) storing, when the relationship between the data corresponding to the first item name and the data corresponding to the second item name satisfies the second condition, metadata including the first item name and the second item name in the data storage module in association with the identification information of the program. Metadata may also be registered in consideration of the data relationship as well as the item name relationship.

The metadata registration method may further include processing of (E) determining whether a relationship between the first item name and a third item name included in a third table, which is different from the first table and the second table and from which the second table is generated together with the first table by executing the program, satisfies a third condition including a condition of an exact match or a partial match, and (F) storing, when the relationship between the first item name and the third item name satisfies the third condition, metadata indicating the relationship between the first item name and the third item name in the data storage module in association with the identification information of the program. Metadata may also be registered in consideration of the relationship between the item name included in the first table and the item name included in the third table. Further, metadata of a program regarding, for example, a join operation may be registered.

The metadata registration method may further include processing of (G) determining whether a relationship between the data corresponding to the first item name and data corresponding to the third item name included in the third table satisfies a fourth condition including a condition of an exact match or a partial match, and (H) storing, when the relationship between the data corresponding to the first item name and the data corresponding to the third item name satisfies the fourth condition, metadata including the first item name and the third item name in the data storage module in association with the identification information of the program. Metadata may also be registered in consideration of the relationship between the data corresponding to the item name included in the first table and the data corresponding to the item name included in the third table.

The first condition may include a condition that the first item name matches the second item name by right truncation. Metadata of a program regarding an operation for a specific item (for example, calculation of a total) may be registered.

The second condition may include a condition that the data corresponding to the second item name exactly matches the data corresponding to the first item name at a first ratio or higher, or a condition that the data corresponding to the second item name matches the data corresponding to the first item name by right truncation at a second ratio or higher. Metadata of a program regarding, for example, aggregation processing may be registered.

The fourth condition may include a condition that the data corresponding to the third item name exactly matches the data corresponding to the first item name at a third ratio or higher, or a condition that the data corresponding to the third item name partially matches the data corresponding to the first item name at a fourth ratio or higher. Metadata of a program regarding, for example, a join operation may be registered.

A program for causing a computer to execute the processing by the method described above may be created. The program is stored in a computer-readable storage medium or a storage device such as a flexible disk, a CD-ROM, a magneto-optical disk, a semiconductor memory, or a hard disk. Intermediate processing results are temporarily held in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method executed by a processor, the method comprising:

acquiring one or more first tables each including first data groups regarding respective first items;

executing a program with the one or more first tables set as an input;

acquiring a second table corresponding to a result of executing the program with the one or more first tables set as the input, the second table including respective second items and respective second data groups;

determining whether the one or more first tables are plural;

specifying, when determining that the one or more first tables are plural, a first combination of one first item of the first items of one first table in the one or more first tables and another first item of the first items of another first table in the one or more first tables;

determining, in the specified first combination, whether a first name of the one first item and a first name of the another first item partially match using a table which stores a matching state between the first items as a first condition to register metadata of the program indicating a relationship between the first items;

generating, when determining that the first name of the one first item and the first name of the another first item partially match, second information indicating the relationship between the first items in association with identification information of the program while defining parts that partially match;

specifying a second combination of the one first item of the first items of one first table in the one or more first tables and one second item of the second items of the second table;

determining, in the second combination, whether a first name of the one first item and a second name of the one second item partially match using the table which stores a matching state between the first item and the second item as a second condition to register the metadata of the program indicating a relationship between the first item and the second item;

generating, when determining that the first name of the one first item and the second name of the one second item partially match, first information indicating the relationship between the first item and the second item in association with the identification information of the program while defining parts that partially match;

registering the first information and the second information in a memory as the metadata of the program; and outputting, when an instruction to output the metadata of the program is received, the metadata including the first information and the second information that is acquired from the memory.

2. The method according to claim 1, further comprising:
generating third information including the first name and the second name when the first data group regarding the one first item and the second data group regarding the one second item have a relationship in which the first data group and the second data group match each other by right truncation at a first ratio or higher; and
storing the third information as the metadata.

3. The method according to claim 1, further comprising:
generating third information including the first name and the second name when the first data group regarding the one first item and the second data group regarding the one second item have a relationship in which the first data group and the second data group exactly match each other at a second ratio or higher; and
storing the third information as the metadata.

4. The method according to claim 1, further comprising:
generating, when the first name of the one first item and the first name of the another first item exactly match each other, fourth information indicating the relationship between the first names while defining entire names as variable parts; and
storing the fourth information as the metadata.

5. The method according to claim 4, further comprising:
generating fifth information including the first name of the one first item and the first name of the another first item when the first data group regarding the one first item and the first data group regarding the another first item have a relationship in which the first data groups partially match at a third ratio or higher; and
storing the fifth information as the metadata.

6. The method according to claim 4, further comprising:
generating fifth information including the first name of the one first item and the first name of the another first item when the first data group regarding the one first item and the first data group regarding the another first item have a relationship in which the first data groups exactly match each other at a fourth ratio or higher; and
storing the fifth information as the metadata.

7. The method according to claim 1, further comprising:
generating, when the first name of the one first item and the first name of the another first item have the relationship in which the first names partially match, sixth information indicating the relationship between the first names while defining parts that match each other by right truncation as variable parts; and
storing the sixth information as the metadata.

8. The method according to claim 7, further comprising:
generating seventh information including the first name of the one first item and the first name of the another first item when the first data group regarding the one first item and the first data group regarding the another first item have a relationship in which the first data groups partially match at a third ratio or higher; and
storing the seventh information as the metadata.

9. The method according to claim 7, further comprising:
generating seventh information including the first name of the one first item and the first name of the another first item when the first data group regarding the one first item and the first data group regarding the another first item have a relationship in which the first data groups exactly match each other at a fourth ratio or higher; and
storing the seventh information as the metadata.

10. A non-transitory computer-readable storage medium storing instructions that cause a computer to execute a process, the process comprising:
acquiring one or more first tables each including first data groups regarding respective first items;
executing a program with the one or more first tables set as an input;
acquiring a second table corresponding to a result of executing the program with the one or more first tables set as the input, the second table including respective second items and respective second data groups;
determining whether the one or more first tables are plural;
specifying, when determining that the one or more first tables are plural, a first combination of one first item of the first items of one first table in the one or more first tables and another first item of the first items of another first table in the one or more first tables;
determining, in the specified first combination, whether a first name of the one first item and a first name of the another first item partially match using a table which stores a matching state between the first items as a first condition to register metadata of the program indicating a relationship between the first items;
generating, when determining that the first name of the one first item and the first name of the another first item partially match, second information indicating the relationship between the first items in association with identification information of the program while defining parts that partially match;
specifying a second combination of the one first item of the first items of one first table in the one or more first tables and one second item of the second items of the second table;
determining, in the specified second combination, whether a first name of the one first item and a second name of the one second item partially match using the table which stores a matching state between the first item and the second item as a second condition to register the metadata of the program indicating a relationship between the first item and the second item;
generating, when determining that the first name of the one first item and the second name of the one second item partially match, first information indicating the relationship between the first item and the second item in association with the identification information of the program while defining parts that partially match;
registering the first information and the second information in a memory as metadata of the program; and
outputting, when an instruction to output the metadata of the program is received, the metadata including the first information and the second information that is acquired from the memory.

11. A device comprising:
a memory; and
a processor coupled to the memory and configured to:
acquire one or more first tables including first data groups regarding first items,
execute a program with the one or more first tables set as an input;
acquire a second table corresponding to a result of executing the program with the one or more first tables set as the input, the second table including respective second items and respective second data groups,
determine whether the one or more first tables are plural;
specifying, when determining that the one or more first tables are plural, a first combination of one first item of the first items of one first table in the one or more first tables and another first item of the first items of another first table in the one or more first tables;

determine, in the specified first combination, whether a first name of the one first item and a first name of the another first item partially match using a table which stores a matching state between the first items as a first condition to register metadata of the program indicating a relationship between the first items;

generate, when determining that the first name of the one first item and the first name of the another first item partially match, second information indicating the relationship between the first items in association with identification information of the program while defining parts that partially match;

specify a second combination of the one first item of the first items of one first table in the one or more first tables and one second item of the second items of the second table;

determine, in the specified second combination, whether a first name of the one first item and a second name of the one second item partially match using the table which stores a matching state between the first item and the second item as a second condition to register the metadata of the program indicating a relationship between the first item and the second item;

generate, when determining that the first name of the one first item and the second name of the one second item partially match, first information indicating the relationship between the first item and the second item in association with the identification information of the program while defining parts that partially match, register the first information and the second information in the memory as metadata of the program, and output, when an instruction to output the metadata of the program is received, the metadata including the first information and the second information that is acquired from the memory.

12. The device according to claim 11, wherein the processor is configured to:

generate third information including the first name and the second name when the first data group regarding the one first item and the second data group regarding the one second item have a relationship in which the first data group and the second data group match each other by right truncation at a first ratio or higher, and store the third information as the metadata.

13. The device according to claim 11, wherein the processor is configured to:

generate third information including the first name and the second name when the first data group regarding the one first item and the second data group regarding the one second item have a relationship in which the first data group and the second data group exactly match each other at a second ratio or higher, and store the third information as the metadata.

14. The device according to claim 11, wherein the processor is configured to:

generate, when the first name of the one first item and the first name of the another first item exactly match each other, fourth information indicating the relationship between the first names while defining entire names as variable parts, and store the fourth information as the metadata.

15. The device according to claim 14, wherein the processor is configured to:

generate fifth information including the first name of the one first item and the first name of the another first item when the first data group regarding the one first item and the first data group regarding the another first item have a relationship in which the first data groups partially match at a third ratio or higher, and store the fifth information as the metadata.

16. The device according to claim 14, wherein the processor is configured to:

generate fifth information including the first name of the one first item and the first name of the another first item when the first data group regarding the one first item and the first data group regarding the another first item have a relationship in which the first data groups exactly match each other at a fourth ratio or higher, and store the fifth information as the metadata.

17. The device according to claim 11, wherein the processor is configured to:

generate, when the first name of the one first item and the first name of the another first item have the relationship in which the first names partially match, sixth information indicating the relationship between the first names while defining parts that match each other by right truncation as variable parts, and store the sixth information as the metadata.

18. The device according to claim 17, wherein the processor is configured to:

generate seventh information including the first name of the one first item and the first name of the another first item when the one first data group regarding the first item and the first data group regarding the another first item have a relationship in which the first data groups partially match at a third ratio or higher, and store the seventh information as the metadata.

19. The device according to claim 17, wherein the processor is configured to:

generate seventh information including the first name of the one first item and the first name of the another first item when the one first data group regarding the first item and the first data group regarding the another first item have a relationship in which the first data groups exactly match each other at a fourth ratio or higher, and store the seventh information as the metadata.

* * * * *